Inventor
STANLEY MAYNER
Thomas Mayner
Attorney

Dec. 9, 1947.　　　　S. MAYNER　　　　2,432,115
TURBINE TYPE HYDRAULIC TORQUE CONVERTER
Filed Aug. 13, 1942　　　3 Sheets-Sheet 2

Inventor
STANLEY MAYNER
By Thomas S Mayner
Attorney

Dec. 9, 1947.  S. MAYNER  2,432,115
TURBINE TYPE HYDRAULIC TORQUE CONVERTER
Filed Aug. 13, 1942  3 Sheets-Sheet 3

Inventor
STANLEY MAYNER
By Thomas S Mayner
Attorney

Patented Dec. 9, 1947

2,432,115

UNITED STATES PATENT OFFICE 2,432,115

TURBINE TYPE HYDRAULIC TORQUE CONVERTER

Stanley Mayner, Cleveland, Ohio, assignor of one-fourth to Thomas S. Mayner, Willoughby Township, Lake County, Ohio Application August 13, 1942, Serial No. 454,639

13 Claims. (Cl. 60—54)

This invention relates to a power transmitting apparatus and more particularly to a fluid torque converter.

It is a primary object to provide a new and novel apparatus of this character having high efficiencies.

It is another object to provide a torque converter that utilizes essentially kinetic energy.

It is a further object to provide a torque converter that will permit the transmission of any torque reduction, that is, multiplication of torque to, generally, any desired ratio.

It is a further object to provide a torque converter that is completely cushioned.

It is a still further object to provide a type of construction, that permits the flow of fluid freely through the various members, and one that is inherently self-cooling.

These and other objects of my invention will be readily apparent from the following description and attached drawing, wherein.

Figure 1:
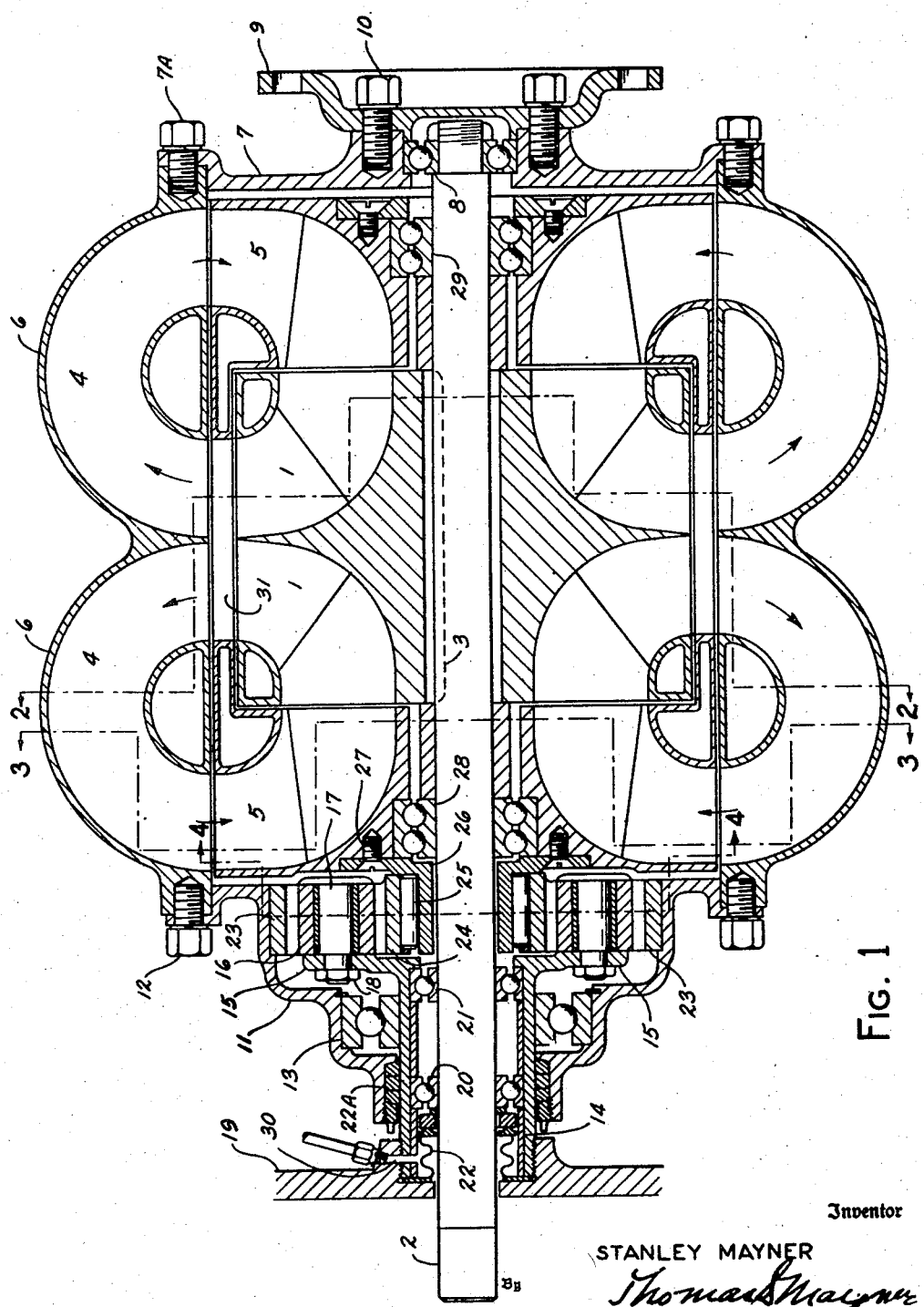
Fig. 1 represents in cross section my fluid torque converter.

With reference to Fig. 1, I show therein my torque converter which comprises, for example, a symmetrically constructed impeller or driving member 1 of simple and straight construction and fixed by means of a key 3 to a main shaft 2 which is rotated by a prime mover (not shown).

The primary receiving member, or driven member 4, is composed of a plurality of duplicate, 180-degree, substantially semi-circular fluid reversing recesses, angularly and circumferentially superimposed (see Figs. 2, 3), forming a symmetrical plurality of buckets. These semi-circular recesses or buckets receive the fluid from the blades of the driving member 1; and the unit may be said to be a series of circumferential buckets with a number of nozzles or sluiceways continually following them.

Interposed between the exit of the driven member 4 and the driving member 1 is a secondary driven member 5, completely independent of the unit except through an overrunning clutch as will be hereinafter more fully explained. The fluid leaving the driving member 1 will act and react on the driven member 4 which is thus subject to the maximum possible output of kinetic energy, and substantially the same velocity head of the fluid entering driven member 4 will act on the secondary driven member 5, which torque when added to that of the driven member 4 will, as is obvious, give the maximum possible torque obtainable. The members 5 are desirably connected by a tension member 31 angularly positioned as not to obstruct the flow of fluid from the impeller.

The external housing 6 composed of the plurality of 180-degree recesses is carried by an end plate or cover plate 7 at one end, held by bolts 7A and including a shaft bearing 8. To this end plate may be fixed another plate 9 by means of bolts 10 and which can be fastened to a propulsion shaft having a similarly attaching part. This method of mounting plate 9 forms a perfectly tight oil seal at this end of the torque converter.

The other end is enclosed by cover plate 11 fixed to the torque converter housing 6 by means of bolts 12. The supporting cover plate 11, as well as the connected elements, rotates on bearing 13 mounted on a sleeve 14 having a flared end 15 supporting intermediate gears 16 mounted on stud shafts 17 threaded at one end, with the gears held thereon by means of nuts 18. The sleeve 14 is screwed at its other end to a reaction plate member 19 fixed to the frame holding the entire unit, or to the chassis. The reaction member is located externally of the converter, the shaft carrying the impeller 1 rotates within the reaction member and sleeve 14, and independently of the reaction member, while the driven member 4 or housing 6 rotates about the sleeve 14. As shown, the reaction of the unit is taken through the intermediate gears 16 on flanged sleeve 14 which in turn is fixed to member 19. The driving shaft 2 rotates within the sleeve 14 on bearings 20, 21. Suitable packing or sealing means as 22, 22A can be used to prevent the loss of the working fluid from the interior of the converter.

Within the cover plate 11 and fastened rigidly to it is an annular gear 23, and another gear 24 geared thereto through intermediate gears 16 and riding an overrunning clutch designated here by means of a roller 25 but which will be later more fully explained. The overrunning clutch and gear 24 are supported on a circumferential frame 26 fastened rigidly by screws 27 to the second driven member's frame. The secondary driven member 5 rotates on bearings 28 and 29 mounted on the main shaft 2 at each end of the member. The impeller or driving member 1 is, of course, directly mounted on main shaft 2.

Figure 2:
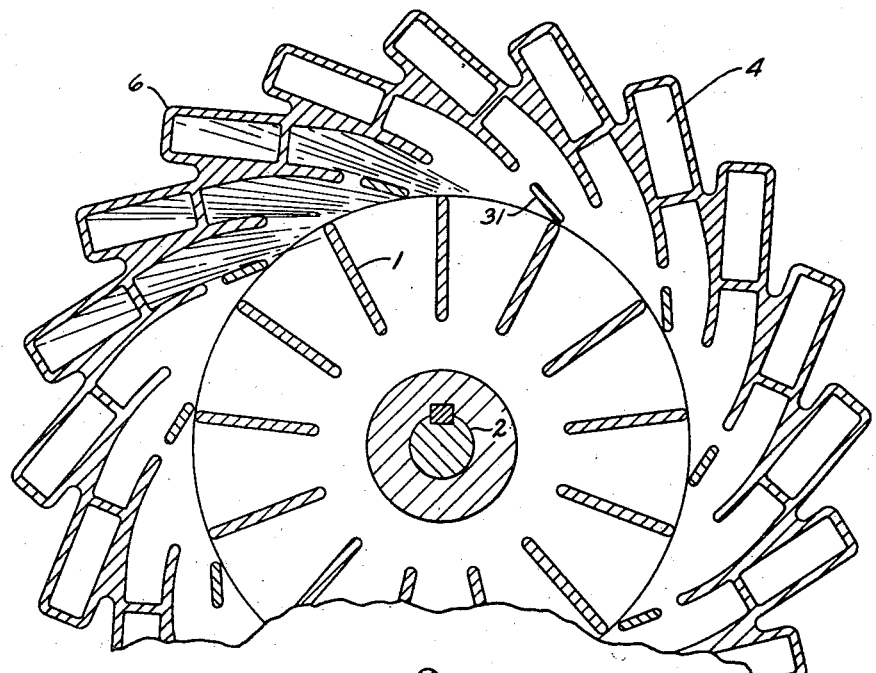
Fig. 2 represents a section taken across line 2—2 of Fig. 1.

Referring to Fig. 2 taken across line 2—2 of Fig. 1, I show the driving blades 1 as simple straight blades. Such a construction is advantageous since it is my purpose to avoid the creation of pressure energy and only to move fluid mass. By not creating pressure, resultant heat and its dissipation is avoided. Furthermore, there is a tendency in pump design toward radial vanes as they are thought to be superior to curved vanes for high speeds as well as for moderate speeds, where pressure is to be avoided. In pumps where there is a conversion of kinetic energy to pressure energy, then to potential, this transfer of energy from one to the other results in considerable waste of the initial energy, which waste I substantially fully avoid by utilizing essentially only kinetic energy.

The receiving buckets or semi-circular recesses composing the driven member are particularly desirably superimposed circumferentially, so that each is at an identical desirable receiving angle of the incoming fluid of which the absolute velocity angle is substantially zero. The tangentially, circumferentially superposed buckets face inwardly, their inlets and outlets being positioned in lines substantially parallel to the axis of rotation of the driven member which they form. As shown in the drawing the bucket ends also extend outwardly to make the exterior form of the driven member a discontinuous circle. The fluid enters all buckets simultaneously, since they are equidistant from the center, at their inner sides, reversing direction during its passage, acting and reacting on each bucket at substantially the same velocity head with which it entered.

The entry of the fluid into the buckets or recesses is advantageously made cleanly and without contraction or obstruction. It is then reversed in a nearly straight line without change in plane and farthest from the center of the shaft, thus creating the highest torque possible and doing work most efficiently in accordance with recognized hydraulic principles.

Figure 3:
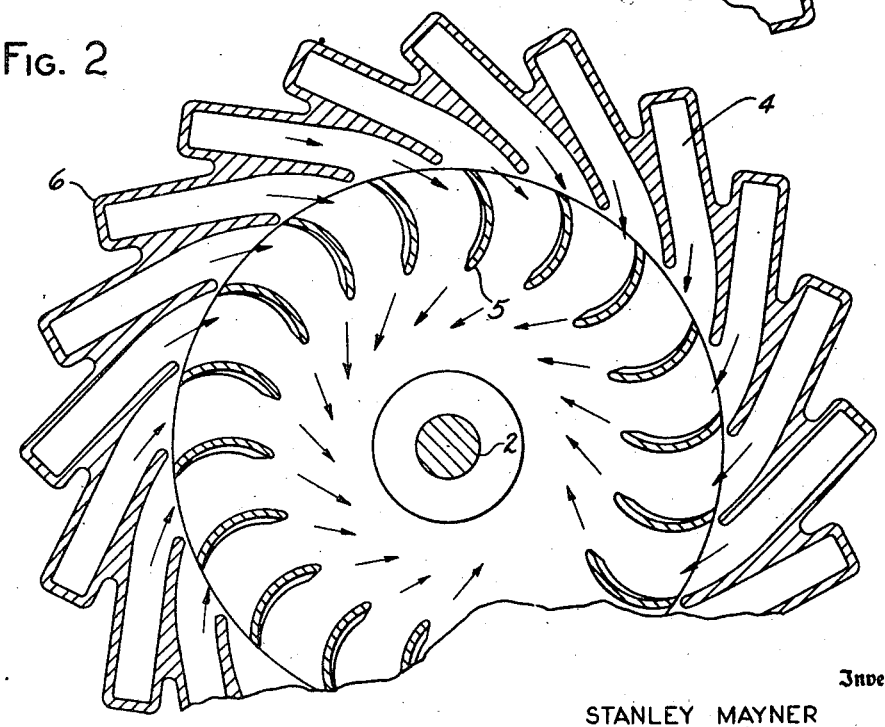
Fig. 3 represents a section taken across line 3—3 of Fig. 1.

Upon exit from buckets 4 the fluid reacts on the secondary driven members 5 as shown in Fig. 3 which are desirably curved to act also as guide members for the fluid into the impeller. The path of the fluid from the impeller and back into it is a free and unbroken stream line gently diverted into the direction of rotation of the impeller. It is to be noted that the fluid in its travel follows its initial direction as it moves in the direction of the rotating members although it has a transverse helicoidal action upon leaving the secondary driven member. And since the fluid flows in a continuous direction frictional losses are utilized to an advantage in my converter. By gearing the secondary driven members to the driven member and desired torque ration can be obtained.

Figure 4:
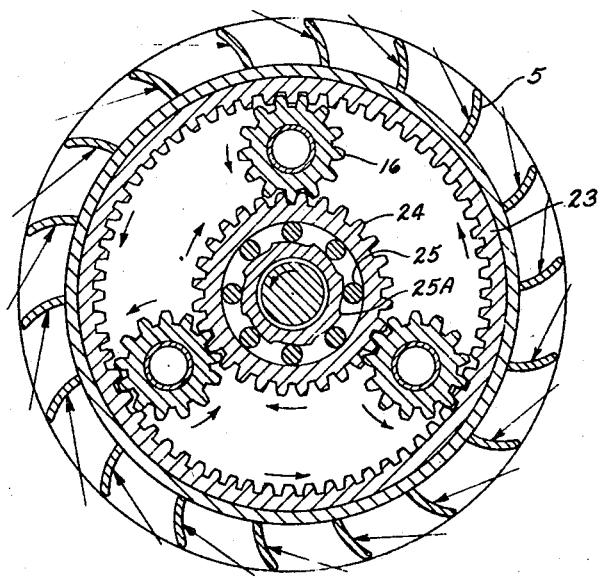
Fig. 4 represents a section taken across line 4—4 of Fig. 1.

In Fig. 4 I show my torque multiplying or reducing means and the overrunning clutch hereinbefore mentioned whereby the torque of members 4 and 5 is combined to give a single total torque output acting on a driven shaft. The opposite rotation of members 4 and 5 is converted into one direction through annular gear 23, intermediate gear 16 and pinion gear 24. The annular gear 23 is fixed to cover plate 11 which is rigidly fastened to housing 6 of the converter (see Fig. 1). Pinion gear 24 is mounted on bearing rollers 25 of the overrunning clutch while the intermediate gears 16 are carried by the flanged portion 15 of the reaction member 19, and of course, are in constant mesh with the other two.

The overrunning clutch is composed of a plurality of circumferential cams 25A and roller bearings 25, the pinion gear 24 moving on the bearing rollers. The overrunning clutch is of the floating type operating in accordance with load conditions, and it is attached to the secondary driving member. Thus the secondary member through the clutch, pinion gear, and intermediate gear is tied in with the driven member 4, and both members' torques are combined and may be multiplied desirably through various gear ratios.

Under load conditions, an increase in fluid flow causes member 4 and secondary driven member 5 to rotate more rapidly. The speed of the secondary member is determined by the gear ratios and can be much greater than that of the driven member. The velocity head of the fluid acting on member 5 however, is substantially that of the fluid acting on the driven member. As to mechanical operation, the increase in reaction on blades 5 causes the cam-clutch to lock and the torque on the secondary driven member is transmitted through the pinion to the intermediate gears, likewise the torque on the driven member is transmitted to the intermediate gears through the annular gear 23, the two torques being combined, multiplied and transmitted to member 9.

Due to the method of mounting pinion gear 24 on the cam roller bearings, the gear will under certain conditions be free, that is, float. At such times it will assume a position dictated by the load on the intermediate gears 16. This is desirable in that there is always an equalization of load on the pinion.

At high speeds and decreasing load, the fluid reacts less and less on the secondary member decreasing to the point where the member is declutched assuming a guiding position. Since it is not held it floats, continually adjusting itself to a most suitable position and, of course, preventing any possible counterhead.

The gears 16, as shown in Fig. 4, are action and reaction gears, taking the torque from the driven and secondary driven members. These gears, through the annular gear and through the driven member 4 determine the unlocked position of the secondary member, and combine and multiply the torque when the member is locked. Since gears 16 take the reaction and therefore member 19, it is apparent that member 5 acts like a driving member for although it is fluid driven it drives through gears 16.

It will be further noted that the secondary member 5, because of the overrunning clutch, is at desirable times entirely free from the rest of the unit. It is impossible to have it rotate in a reverse direction, as when the vehicle would run ahead of the prime mover, and thus create a counterhead for the member would be immediately declutched when under no load or fluid reaction. It acquires a position of guiding or transmitting only that quantity or amount of fluid at a velocity equivalent to the output of the prime mover. In addition, this construction, gives a "cushion" to the unit and no shock may be imparted to the prime mover, as the unit becomes entirely separated from the prime mover, the only connection being through the fluid.

By the means, then, of any desirable gear ratio of gears 16, 23, 24 in my unit I can obtain any torque required to meet a particular design. The unit, as a result of the members 4 and 5 turning in opposite direction, in and of itself creates a simple internal gear reduction, and by inserting the overrunning clutch the very desirable result, that of creating a highest possible torque, is had.

The path of the fluid in my converter is generally smooth and continuous. It flows freely without constriction or any obstruction. There is no substantial turbulence at any point in its path as is common in the conventional coupling and converter. Also there is no gyroscopic action where a vortex is created at a right angle to the moving members, or the movement of fluid back and forth between stationary and moving members creating turbulence upon turbulence resulting in considerable heat and energy loss. In contra-distinction the fluid in my unit is guided smoothly and gently in the same direction, although through a bending path, and in the same plane. My construction thus avoids the detrimental effects mentioned.

Additionally, the shape of the housing composed of a plurality of circumferentially superimposed buckets is inherently a self-cooling type, for each bucket or recess protrudes independently outwardly and acts as a cooling fin.

I further provide a simple means whereby the converter is kept filled with a working fluid in the event of the loss of same through the seals. In Fig. 1 in the reaction member 19 which is fixed to some part of the frame (not shown) holding the converter I show a passage 30 going completely through the sleeve 14. To this passage there can be connected an external reservoir of the working fluid, the reservoir being above the center of the converter. With the unit in operation the fluid is forced outwardly from the center of the unit creating a vacuum and thereby drawing upon the reservoir and keeping the interior filled at all times.

Throughout these specifications I have referred to the receiving buckets comprising driven member 4 as being substantially semi-circular. From a design standpoint it may be preferably that the buckets be semi-circular, however, it is not absolutely essential that a constant radius be maintained in their design so long as a substantial or complete reversal is had in the manner described. Thus the shape of the buckets may vary but only to the extent that an undisturbed, even flow is maintained and returned substantially 180° from its entry. Furthermore, the torque converter of Fig. 1 need not comprise duplicate sections as shown since for most purposes a single section will prove adequate.

While I have described my apparatus in accordance with the illustrations shown in my drawing and described the preferred embodiment, it will be understood to those skilled in the art that this is illustrative only, and that my invention is not to be limited thereto, except as required by the claims.

What I claim as new, and desire to secure by Letters Patent of the United States is:

1. A fluid torque converter comprising a fluid energizing member and a rotor composed of a plurality of inwardly facing fluid receiving and reversing buckets having inlets and outlets positioned in lines substantially parallel to the axis of rotation of said rotor, said rotor adapted to be actuated by fluid energized by said energizing member.

2. A fluid torque converter comprising a fluid energizing member, a rotor composed of a plurality of inwardly facing fluid receiving and reversing buckets having inlets and outlets positioned in lines substantially parallel to the axis of rotation of said rotor being adapted to receive and reverse said fluid, and at least one other rotor positioned adjacent the bucket outlets being adapted to receive the fluid from said buckets and being actuated thereby.

3. In an apparatus for intraconversion of fluid and mechanical energy, a rotor comprising a rotatable annular member being composed of a plurality of interiorly facing fluid receiving and reversing buckets, said buckets being positioned tangentially circumferentially, their end portions extending tangentially outwardly forming an arcuate periphery having a discontinuous circular surface.

4. In an apparatus for intraconversion of fluid and mechanical energy, a rotor comprising a rotatable housing member incorporating an annular series of inwardly facing fluid receiving and reversing buckets having inlets and outlets positioned in lines substantially parallel to the axis of rotation of said rotor.

5. An apparatus for intraconversion of fluid and mechanical energy comprising a rotatable housing member adapted to rotate continuously incorporating a rotor of a plurality of inwardly facing fluid receiving and reversing buckets having inlets and outlets positioned in lines substantially parallel to the axis of rotation of said rotor, a fluid energizing member within said housing member and being positioned adjacent the bucket inlets, and at least one other rotor within said rotatable housing being positioned adjacent the bucket outlets, said last rotor being adapted to be actuated by the fluid from said bucket outlets.

6. A fluid torque converter comprising; a fluid driving member having substantially radial fluid outlets, a fluid driven member composed of a plurality of adjacent, tangentially, circumferentially positioned inwardly facing fluid receiving and reversing buckets having inlets and outlets in lines substantially parallel to the axis of rotation of said member, a reversely rotating secondary driven member positioned adjacent the outlets of said buckets of said first driven member, a fixed reaction means for transmitting the load output of said driven members, and means cooperating with said reaction means responsive to load on the secondary driven member adapted automatically to couple or uncouple said secondary member, to said reaction means.

7. A fluid power transmitting apparatus of the character described comprising a fluid driving member, a rotatable housing member defining an annular fluid driven member composed of a plurality of fluid receiving and reversing buckets facing inwardly and having inlets and outlets positioned in lines substantially parallel to the rotation axis of said member circumferentially superposed at a fluid receiving angle approximating the tangential angle of the fluid leaving the impeller, a second driven member receiving the reversed fluid from said first driven member and being driven thereby, both said fluid driving member and said second driven member being positioned within said rotatable housing member adjacent said bucket inlets and outlets and means for providing reaction for said driven members.

8. In a power transmitting apparatus of the character described, a fluid driving member, a first fluid driven member having an annular gear, a reversely rotating secondary fluid driven member having operatively attached thereto a pinion gear, said members disposed in a fluid receiving relation in the order enumerated, a reaction means providing reaction for said first and second driven members comprising a fixed gear carrier and intermediate gears meshing with said annular and pinion gears, and means combining the torque output of said driven members comprising a one-way clutch attached to said secondary driven member and operating in accordance with load conditions.

9. In a power transmitting apparatus of the character described, a fluid driving member, a first fluid driven member having an annular gear, a reversely rotating secondary fluid driven member having operatively attached thereto a pinion gear, said members disposed in a fluid receiving relation in the order enumerated, a reaction member providing reaction for said first and second driven members comprising a fixed gear carrier and intermediate gears meshing with said annular and pinion gears, and a one-way clutch attached to said secondary driven member adapted to combine the torque output of said driven member during load periods and during no load periods releasing the secondary driven member to act as a guide member in a sense dictated by said driven member.

10. In a fluid transmission of the character described, a fluid driving member, a fluid driven member, a reversely rotating secondary fluid driven and guide member, said members positioned in a fluid receiving relation in the order enumerated, a fixed reaction member having reaction gears, an annular gear attached to said driven member, a one-way clutch, a pinion gear on said one-way clutch, said clutch being attached to said secondary driven member, said reaction gears intermediately positioned and in constant meshing relation with said annular gear and pinion gear, and said pinion gear being adjustably positioned on said clutch in accordance with the load on the intermediate reaction gears.

11. In a fluid transmission of the character described, a fluid driving member, a fluid driven member composed of a plurality of adjacent, identical, substantially semi-circular fluid reversing buckets circumferentially superimposed equidistant from the center adapted to receive and reverse the fluid stream imparted by said driving member, a reversely rotating secondary driven member having fluid receiving blades positioned adjacent the outlets of said buckets for receiving reversed fluid stream from said reversing buckets and redirecting said stream into the fluid driving member, said members being in fluid receiving relation in the order enumerated, an annular gear attached to said driven member, a pinion gear attached to said secondary driven member, a reaction member comprising a fixed gear carrier and gears positioned intermediately of said annular and pinion gears and in meshing relationship therewith, said gears combining and multiplying the output of said driven members, and a one-way clutch between the pinion gear and the secondary member.

12. In a fluid power transmitting apparatus of the character described, a fluid driving member, a first driven member composed of a plurality of fluid receiving and reversing buckets circumferentially superposed, a reversely rotating secondary driven member positioned adjacent to the bucket outlets of said first driven member, the buckets and blades of the first and second members being positioned to receive the actuating fluid at substantially its zero velocity angle, and a torque transmitting means for said driven members including a fixed reaction means comprising a gear carrier and gears, an annular gear fixed to said first driven member, a floating pinion and reverse clutch fixed to said secondary driven member, the gears of said fixed gear carrier being in meshing relation with said annular and pinion gears, and said torque transmitting means adapted to adjustably position itself in accordance with load.

13. A fluid power transmitting apparatus comprising a fluid driving member, a rotatable housing member defining an annular fluid driven member composed of a plurality of fluid receiving and reversing buckets circumferentially superposed at fluid receiving angles approximating the angle of the fluid leaving the impeller blades, a second driven member receiving the reversed fluid from the buckets of said first driven member and being driven thereby, said second driven member being shaped so as to redirect the fluid passing through it back into the impeller blades, an annular gear attached to said rotatable housing, a pinion gear mounted on a one-way clutch attached to said secondary driven member, said secondary driven member being in a locked position only when subjected to fluid action in a reverse direction, and a reaction member comprising a fixed gear carrier and gears, said gears being positioned intermediately of said annular and pinion gears and being in meshing relationship therewith.

STANLEY MAYNER.

REFERENCES CITED

The following references are of record in the file of this patent:

UNITED STATES PATENTS

| Number | Name | Date |
|---|---|---|
| 448,621 | Altham | Mar. 17, 1891 |
| 475,957 | Altham | May 31, 1892 |
| 835,370 | Smith | Nov. 6, 1906 |
| 1,137,704 | Dake | Apr. 27, 1915 |
| 1,254,465 | Bentley | Jan. 22, 1918 |
| 1,855,967 | Jandasek | Apr. 26, 1932 |
| 2,005,444 | Weiss | June 18, 1935 |
| 2,084,312 | Astafiev | June 22, 1937 |
| 2,145,005 | Fichtner | Jan. 24, 1939 |
| 2,145,006 | Fichtner | Jan. 24, 1939 |
| 2,152,113 | Van Lammeren | Mar. 28, 1939 |
| 2,186,025 | Jandasek | Jan. 9, 1940 |
| 2,276,862 | Peterson | Mar. 17, 1942 |
| 2,297,259 | Speiser | Sept. 29, 1942 |
| 2,331,075 | Kumm | Oct. 5, 1943 |
| 2,339,483 | Jandasek | Jan. 18, 1944 |
| 2,379,015 | Lysholm | June 26, 1945 |

FOREIGN PATENTS

| Number | Country | Date |
|---|---|---|
| 434,707 | Great Britain | 1935 |
| 442,363 | Great Britain | 1936 |